J. EATON.
MOTOR CONTROL.
APPLICATION FILED JAN. 2, 1917.

1,321,019.

Patented Nov. 4, 1919.

Inventor:
John Eaton,
by Albert G. Davis
His Attorney.

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

MOTOR CONTROL.

1,321,019.   Specification of Letters Patent.   Patented Nov. 4, 1919.

Application filed January 2, 1917. Serial No. 140,117.

*To all whom it may concern:*

Be it known that I, JOHN EATON, a subject of the King of Great Britain, residing at Schenectady, county of Schenectady, State of New York, have invented certain new and useful Improvements in Motor Controls, of which the following is a specification.

My invention relates to the control of electric motors and it provides improved means whereby they may be started and stopped and generally controlled in a safe, reliable and efficient manner.

More specifically, my invention relates to the control of an electric motor wherein the motor circuits are controlled by means including electromagnetic switches or contactors having resilient wiping contact members, the coils of which are energized through a circuit or circuits in shunt to the motor and are controlled by means of a master switch or switches. One of the objects of my invention is to provide an improved and comparatively inexpensive arrangement, devoid of complications, for the control of an electric motor by the use of these switches whereby the motor may be started and run at a slow speed, after which it may be automatically brought up to full speed, or it may be started and be automatically gradually accelerated up to the full running speed without having the acceleration arrested at the definite slow speed, and then when desired the motor may be again run at the reduced speed or stopped altogether.

Another object of my invention is to provide an arrangement which obviates the necessity of using the troublesome interlocks or auxiliary switches which are ordinarily provided to secure the desired sequence of operation of the electromagnetic switches.

A further object is to provide an arrangement in which the current in the coil circuit of each electromagnetic switch is automatically increased as soon as the tips of the switch contacts engage each other so that the resilient wiping contacts will be given a strong wiping action in closing.

A still further object is to provide that the coils of the switches may be used on circuits of different voltages, the arrangement being such that when a switch is closed and the contacts fully wiped home, the current in the operating coil will be reduced to prevent overheating.

These and other objects are obtained by the arrangement, simple in construction and devoid of complication, which I have shown on the accompanying drawings and described fully hereinafter.

Figure 1:
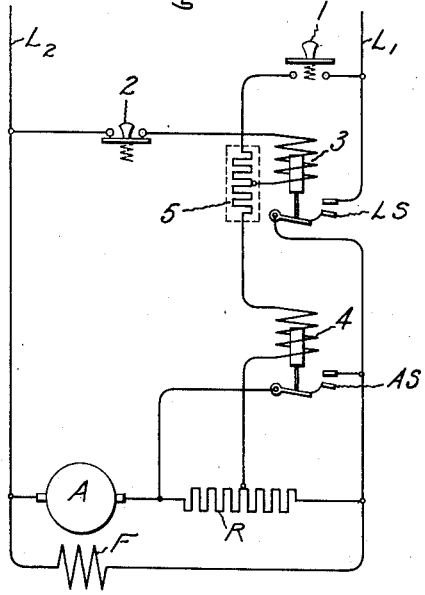
Figure 2:
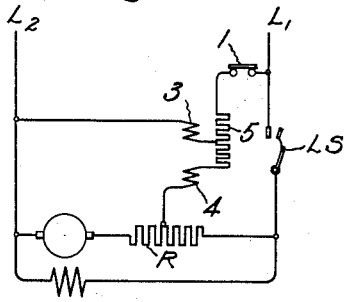
Figure 5:
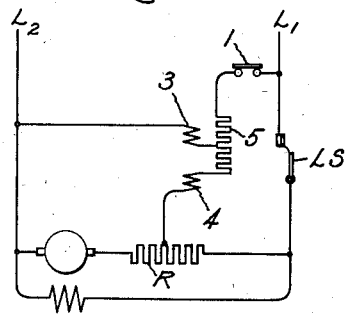

Referring to the drawings, Figure 1 shows diagrammatically an embodiment of my invention in the control of an electric motor, and Figs. 2 and 5 inclusive are simplified diagrams of the various relations and changes in the control switches and connections which are caused by closing and opening the starting and controlling push button.

Referring to Fig. 1, the electric motor having an armature A and shunt field F is adapted to be energized from the source of supply $L_1$ $L_2$ upon the closing of the electromagnetic line switch LS, and the starting and controlling resistance R in the motor armature circuit is adapted to be short circuited by means of the accelerating switch AS. These electromagnetic switches are of the type which are usually termed contactors, and the coils of these switches are adapted to be energized through a circuit or circuits in shunt to the motor armature. Such switches are usually termed shunt contactors to distinguish from series contactors which have their operating coils included in the motor circuits. The line switch and the accelerating switch are adapted to be controlled by means of the normally open manually operated pilot or master switch 1, shown as a push button, my preferred form, in Fig. 1. This push button is used for starting, reduced speed running, and for slow down after the motor has come up to full speed and it controls the electromagnetic switches in a manner to be hereinafter fully described. The normally closed push button 2, ordinarily referred to as a "stop button" is adapted to deënergize the coils of the line switch and the accelerating switch and thus disconnect the motor from the supply conductors and reinsert the starting and control resistance R in the motor armature circuit when this push button 2 is depressed. The coils 3 and 4 of the line switch and the accelerating switch, respectively, are permanently connected to each other in series in a shunt circuit to the motor armature, and the resistance 5, a part of which is included in this shunt circuit, is provided for adapting the coils 3 and 4 for use on circuits other than those for which these coils were primarily designed. One end of the coil 3 is directly connected to the supply conductor $L_2$ through a circuit including the stop push button 2 and the other end of this coil is connected to the resistance 5 at the point determined by the voltage of the particular supply circuit which is used and the voltage for which the coils 3 and 4 are wound. One terminal of the coil 4 of the accelerating switch AS is directly connected to one end of the resistance 5 and the other terminal of this coil is directly connected to the starting and control resistance R at a point determined by the characteristics of the coil 4 and the particular armature speed at which it is desired the accelerating switch shall close. The starting and control push button 1 is included in a circuit between the supply conductor $L_1$ and one terminal of the resistance 5.

Upon pressing the push button 1, the coils 3 and 4 of the line switch and accelerating switch respectively are momentarily energized in multiple across the supply conductors, the circuit of coil 3 including push button 2, the upper section of resistance 5 and push button 1 while coil 4 is energized through the armature, part of resistance R, the whole of resistance 5 and push button 1. The line switch is thereby closed, energizing the motor from the source of supply, and placing a shunt around the coil 4 of the accelerating switch, through the right hand section of resistance R, (which is of relatively low value) and contacts of switch LS. The accelerating switch will not close, however, so long as the short circuit is maintained which will be as long as the push button 1 is closed. When the push button 1 is now released and thus opened, the coils 3 and 4 are energized in series in a shunt circuit to the motor armature and a portion of resistance R; the current in the coil 3 is thereby reduced and the coil 4 is energized to close the accelerating switch AS responsively to the speed of the motor when the armature voltage has built up to the predetermined value at which it is desired that the starting and control resistance R be short circuited. As soon as the contacts of the line switch LS make contact the current in the operating coil 3 of this switch is increased by reason of having the circuit including the coil 4 in multiple with the circuit including the push button 1. The resilient contact member of the line switch LS is thereby given a strong wiping action in closing, but as soon as the push button 1 is released, the current in the coil 3 is reduced since the coils 3 and 4 are then energized in series in the shunt circuit to the motor armature. The line switch will remain closed since it requires less current in its coil circuit to maintain the switch closed than it did originally to close the switch and the reduced current prevents overheating. The accelerating switch likewise in closing increases the current in its coil circuit to give a strong wiping action to the switch contacts. With the line and accelerating switches closed and the motor running at normal full running speed, if it is desired to run the motor at reduced speed for an interval, this may be done by simply pressing the push button 1, thereby shunting the coil 4 of the accelerating switch and causing this switch to drop open and reinsert the resistance R in the motor armature circuit.

It will be assumed that the motor is at rest with all the switches except the stop push button 2 open as shown in Fig. 1, and that it is desired to start the motor. The operation is as follows:—

Figure 3:
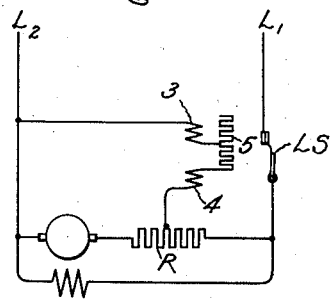
Figure 4:
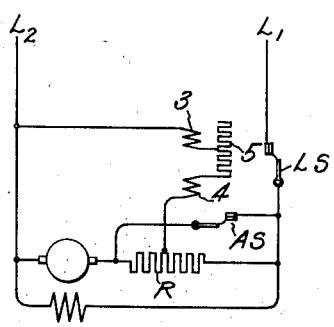

Upon pressing the starting and control push button 1, the coils 3 and 4 of the line switch and the accelerating switch respectively are momentarily connected in multiple across the source of supply. The connections at this instant are as shown in Fig. 2. The circuit for the coil 3 is from the supply conductor $L_1$, the upper portion of the resistance 5, stop push button 2 to the other supply conductor $L_2$. The circuit for the coil 4 of the accelerating switch is from the supply conductor $L_1$, push button 1, resistance 5, left hand portion of resistance R, armature A of the motor to the other supply conductor $L_2$. The coil 3 of the line switch is thereby energized directly across the source of supply with the upper portion of the resistance 5 in its coil circuit, and the line switch will therefore close its contacts. The coil 4 of the accelerating switch is also energized across the source of supply but it has all of the resistance 5 included in its coil circuit and it therefore will not receive sufficient current to energize the accelerating switch to close. If, however, sufficient current should flow through the coil 4 to close the accelerating switch, it will open as soon as the line switch closes because of the shunt established around it. As soon as the movable contact of the line switch engages the stationary contact, the current flowing through the coil 3 will be increased since the coil 3 is then energized through the circuit including the push button 1 and also through the circuit including the contacts of the line switch, right hand portion of resistance R, coil 4 of the accelerating switch, and the lower portion of the resistance 5, the connections being as shown in Fig. 5. Increasing the current in the coil 3 at the moment the contacts of the line switch come into engagement causes the contacts of the line switch to be firmly closed with a strong wiping action. When the line switch closes the motor is energized from the source of supply with the starting and controlling resistance R in the circuit of the armature A. The motor will therefore increase in speed to an amount determined by the resistance R, and as long as the push button 1 is held closed the accelerating switch is held open since its operating coil 4 is shunted by the circuit including the push button 1 as shown in Fig. 5. The motor may therefore be run at this less than normal speed as long as desired by simply holding the push button 1 closed. As soon, however, as the push button 1 is released, the coils 3 and 4 are energized in series in shunt to the motor armature and a portion of resistance R and the current in this circuit is determined by the voltage of the motor armature which varies responsively to the speed of the motor. The circuit for the coils at this period is as shown diagrammatically in Fig. 3. As soon as the push button 1 is released, one of the shunt paths through which the coil 3 was previously receiving current is opened, and the coil 3 is energized in series with the coil 4, thereby decreasing the current in the coil 3 and increasing the current in the coil 4. The coils 3 and 4 will therefore be energized responsively to the voltage of the motor armature and the coil 4 will be energized sufficiently to close its contacts and short circuit the resistance R when the motor has reached the predetermined speed at which it is desired that the resistance R be cut out and the motor accelerated to full running speed. The circuits are now as shown in Fig. 4 which shows the normal relation of the switches and control apparatus when the motor is operating at its normal full running speed. If it is desired to slow down the motor, this can be done by simply pressing the push button 1, thereby shunting the coil 4 of the accelerating switch and causing the accelerating switch to drop its contacts and reinsert the resistance R in the motor armature circuit. The connections are as shown in Fig. 5. The motor will be run at this reduced speed as long as the push button 1 is maintained closed, and when the push button 1 is again opened, the accelerating switch will be closed responsively to the motor speed and the motor will be brought up to full running speed as before. Pressing the stop push button 2 deënergizes the coils of both switches and the motor is disconnected from the source of supply, the starting resistance R reinserted in the motor armature circuit preparatory to again starting and the motor brought to rest.

In the arrangement which I have shown in the drawings, the resistance 5 is shown as included in the coil circuits of the electromagnetic switches. This resistance is provided for adapting the coils of the switches to the voltage of the supply circuit to which the motor is to be connected. If the coils 3 and 4 were primarily designed for use on this particular voltage, the resistance 5 could be eliminated and the arrangement be perfectly operative. It will be seen however that my arrangement has the particular advantage that where the coils are not designed for the particular voltage of the supply circuit to which the motor is to be connected, a single resistance 5 serves to limit the current in both coil circuits, thereby effecting a saving in the cost of material and saving space on the control panel on which the line switch, the accelerating switch, and the control conductors are mounted.

It will be seen from the above that my arrangement provides a control for an electric motor which is reliable, inexpensive to manufacture and devoid of complications, and one whereby the motor may be started and either automatically accelerated to the full running speed, or the speed of the motor can be limited to the particular value as determined by the starting resistance R, and then when desired, by simply releasing the push button 1, the motor will be automatically accelerated to the full running speed. After the motor has come up to full running speed, by pressing the push button 1 which was used to start and control the speed of the motor, the motor speed may be reduced to the value as determined by the resistance R as long as the push button 1 is closed. It will be further seen that none of the troublesome interlocks or auxiliary switches for securing the desired progression of operation of the electromagnetic switches are necessary in my arrangement.

While I have described a specific embodiment of my invention, it should be understood that I do not limit my invention thereto, since various modifications may be made therein without departing from the spirit of my invention, the scope of which is set forth in the claims which are hereto annexed.

What I claim as new and desire to secure by Letters Patent of the United States is:

1. Controlling means for an electric motor comprising two electromagnetic switches, one for connecting the motor to line and the other for accelerating the same, the accelerating switch having its coil connected in series with that of the line switch and energized to close when the motor reaches a predetermined speed.

2. Controlling means for an electric motor comprising two electromagnetic switches, one for connecting the motor to line and the other for accelerating the same, a master switch and connections whereby upon operating the master switch the line switch is closed, the coils of the switches are energized in series and the accelerating switch is energized to close responsively to the speed of the motor.

3. Controlling means for an electric motor comprising two electromagnetic switches, one for connecting the motor to line and the other for accelerating the same, and connections whereby upon closing the line switch the coils of said switches are energized in series responsively to the speed of the motor.

4. Controlling means for an electric motor comprising two electromagnetic switches, one for connecting the motor to line and the other for accelerating the same, a master switch and connections whereby upon operating the master switch the line switch is closed and the coils of the switches are energized in series responsively to the speed of the motor and subsequent operation of the master switch will have no effect upon the line switch.

5. The combination with an electric motor, of an electromagnetic line switch for connecting the motor to a source of supply and a switch for accelerating the same, a master switch, and means whereby operating the master switch in one direction causes the line switch to close, and returning the master switch causes the accelerating switch to be closed responsively to the speed of the motor.

6. The combination with an electric motor, of an electromagnetic line switch for connecting the motor to a source of supply, a switch for accelerating the same, a master switch, and means whereby operating the master switch in one direction and then returning it causes the line switch to close and the accelerating switch to be connected to close responsively to the speed of the motor, and a subsequent operation of the master switch in the original direction causes the accelerating switch to open.

7. The combination with an electric motor of two electromagnetic switches, one for connecting the motor to line and the other for accelerating the same, a master switch biased to open position and connections whereby the closing of the master switch closes the line switch and releasing the master switch energizes the accelerating switch responsively to the speed of the motor.

8. The combination with an electric motor of two electromagnetic switches, one for connecting the motor to line and the other for accelerating the same, a master switch biased to open position and connections whereby the closing of the master switch closes the line switch and releasing the master switch energizes the windings of the two switches in series responsively to the voltage of the motor armature so that the accelerating switch will close when the speed of the motor reaches a predetermined value.

9. The combination with an electric motor of two electromagnetic switches, one for connecting the motor to line, and the other for accelerating the same, a master switch biased to open position and connections whereby closing and releasing the master switch causes the line switch to close and the accelerating switch to be connected responsively to the speed of the motor and subsequent closing of the master switch deenergizes the accelerating switch.

10. The combination with an electric motor, of a starting resistance therefor, an electromagnetic line switch and an electromagnetic accelerating switch for short circuiting the starting resistance, of a master switch and connections whereby the line switch is caused to close and the motor is energized through a circuit including the starting resistance when the master switch is closed, and the accelerating switch energized to close responsively to the speed of the motor by the opening of the master switch.

11. The combination with an electric motor, of an electromagnetic line switch for connecting the motor to a source of supply, a switch for accelerating the same, a master switch, and connections whereby the closing of the master switch closes the line switch, whereupon the opening of the master switch causes the line switch to be maintained closed with a reduced current in its coil circuit and the accelerating switch to be energized to close responsively to the speed of the motor.

12. The combination with an electric motor, of an electromagnetic line switch for connecting the motor to a source of supply and an electromagnetic accelerating switch therefor, the coils of said switches being electrically connected, a master switch and connections whereby closing the master switch closes the line switch, the closing of the line switch deënergizing the accelerating switch, and the opening of the master switch energizing the accelerating switch to close responsively to the speed of the motor.

13. The combination with an electric motor, of an electromagnetic line switch for connecting the motor to a source of supply and an electromagnetic accelerating switch therefor, the coils of said switches being electrically connected, a master switch and connections whereby closing the master switch energizes the line switch to close, the closing of the line switch shunting the coil of the accelerating switch through a circuit including the master switch, and the opening of the master switch energizing the accelerating switch to close responsively to the speed of the motor.

14. Controlling means for an electric motor comprising an electromagnetic line switch, an electromagnetic accelerating switch, the coils of said switches being connected in series in a shunt to the motor armature, a master switch and connections whereby the closing of the master switch closes the line switch, the closing of the line switch operating to deënergize the accelerating switch, and the opening of the master switch operating to reduce the current in the coil circuit of the line switch and energize the accelerating switch to close responsively to the speed of the motor.

15. The combination with an electric motor and a starting resistance therefor, of an electromagnetic line switch for connecting the motor to a source of supply through a circuit including the starting resistance, an electromagnetic accelerating switch for short circuiting the starting resistance, the coils of said switches being connected in series in a shunt to the motor armature, a master switch and connections for connecting the said coils to one of the supply conductors at a point between the two coils, whereby upon closing the master switch the line switch will be energized to close, the closing of the line switch deënergizing the accelerating switch, and the opening of the master switch energizing the accelerating switch to close responsively to the speed of the motor.

16. The combination with an electric motor and source of supply therefor, of a starting resistance, an electromagnetic line switch for connecting the motor to the source of supply and an electromagnetic accelerating switch for short circuiting the starting resistance, the coil of the line switch having one terminal connected to one of the supply conductors and the other terminal connected to one terminal of the coil of the accelerating switch, the other terminal of the coil of the accelerating switch being connected to the starting resistance, a master switch and connections whereby closing and then opening the master switch causes the line switch to close and the accelerating switch to be energized to close responsively to the speed of the motor.

17. The combination with an electric motor and a source of supply therefor, of a starting resistance, an electromagnetic line switch for connecting the motor to the source of supply and an electromagnetic accelerating switch for short circuiting the starting resistance, the coil of the line switch having one terminal connected to one of the supply conductors and the other terminal connected to one terminal of the coil of the accelerating switch, the other terminal of the coil of the accelerating switch being connected to the starting resistance, a master switch and connections whereby closing and then opening the master switch causes the line switch to close and the accelerating switch to be energized to close responsively to the speed of the motor, and a subsequent closing of the master switch deënergizes the accelerating switch.

18. The combination with an electric circuit of means for controlling the same comprising an electromagnetic switch having resilient wiping contacts, a coil for said switch, means for connecting the said coil across the electric circuit to close the switch, and means whereby the current in the said coil is automatically increased to give the switch contacts a strong wiping action in closing when the contact members of said switch touch each other.

19. The combination with an electric circuit of means for controlling the same comprising an electromagnetic switch having resilient wiping contacts, a coil for said switch, a master switch for connecting the said coil across the electric circuit to close the electromagnetic switch, and means whereby the current in the said coil is automatically increased to give the contact members of said electromagnetic switch a strong wiping action in closing when the said contact members touch each other, and the switch held closed by a decreased current in its coil circuit to prevent overheating when the master switch is opened.

In witness whereof, I have hereunto set my hand this 29th day of December, 1916.

JOHN EATON.